3,063,559
PACKAGING TACKY LATEX EMULSION PAINTS IN CONTAINERS MANUFACTURED FROM POLYOLEFINIC MATERIALS
Joseph S. Bergman, P.O. Box 6625, Nashville 12, Tenn.
No Drawing. Filed June 19, 1962, Ser. No. 203,460
2 Claims. (Cl. 206—84)

This invention relates to a new article of manufacture and methods of making same, and more particularly, it relates to novel and improved methods of packaging latex emulsion paints which are tacky. One particularly important application of the invention is in providing a container for latex emulsion paints made by emulsion polymerization proceses.

The polyolefinic materials of which the container is fabricated may be prepared as described in U.S. Patent No. 2,825,721 to J. P. Hogan et al.

Although the details of the preparation of the polyolefinic materials do not constitute a part of this invention, it may be noted for the sake of general reference, that such preparation comprises essentially polymerizing at least one polymerizable olefin at a polymerization temperature up to about 500° F. with a catalyst active for such polymerization comprising chromium oxide and at least one material selected from the group consisting of silica, alumina, zirconia, and thoria with at least part of the chromium being in the hexavalent state at the initial contacting of the hydrocarbon with the catalyst.

The polyolefinic material produced by the patent to Hogan et al. is known as the high density type polyolefinic material having a density between .941–.965 gram per cubic centimeter (ASTM test D–1505–57T). Additionally, it has a melt index of between .1 and 2.0 (ASTM D–1238–57T). The preferred density is .95 gram per cubic centimeter and the pheferred melt index is .5 or less.

Because of the tackiness of latex emulsion paints it cannot be easily carried in plastic containers since it sticks to any of the conventional thermoplastic materials, in fact, sometimes so tightly that its removal from such containers requires very time-consuming, sometimes drastic procedures if the emulsion has a tendency to polymerize.

One object of the present invention is to package the latex emulsion paints and other tacky materials of the same type in a container which will prevent the tacky material from sticking to the container in which it is stored or shipped.

Another object of the invention is to provide a packaging container which is physically and chemically compatible with the latex emulsion or other tacky material of the same type so that after storage in shipment, no deleterious effect is seen.

These and other objects and advantages of the invention will be apparent to those skilled in the art from the following specification.

Broadly, the invention comprises employing a polyolefinic material as prepared by Hogan et al. in U.S. Patent No. 2,825,721. The polyolefinic materials have a high density of approximately .95 and a melt index of .5 are employed in making containers by conventional means such as by extrusion molding or by blowing operations as is well known in the art. Preferably, the container may have a screw on closure arrangement in order to provide a suitable seal to the container for the latex emulsion type paint. In view of the fact that the latex emulsion paint is not tacky to the polyolefinic container, there are no difficulties experienced in opening and closing the screw type container closure as would be experienced should the material be tacky and the thread portion of the container be contaminated with portions of the latex emulsion paint. By this means, an efficient and easily assembled unit may be achieved being a large container for the paint having a screw type arrangement rather than the conventional friction type closure employed in metal containers. Obviously, due to the fact that the polyolefinic material has certain elastomeric tendencies, the friction-held top would not be adequately retained by the container portion so that the screw type arrangement is more suitable.

While the preferred embodiment of the present invention is to fabricate the container from the polyolefinic material, it is also within the purview of the invention to merely fabricate a liner of the polyolefinic material in a suitable container. The suitable container may be constructed of metal, glass or plastic material and the like.

It is not intended that this invention be limited to the examples or modifications which have been described merely for the sake of illustration, but only by the appended claims in which it is intended to claim all novelty inherent to the invention as well as all modifications coming within the scope and spirit of the invention.

What is claimed is:

1. A package comprising a substantially rigid container substantially filled with a tacky latex emulsion paint, said container comprising walls with inner surfaces of a high density polyethylene having a density of between about .941–.965 gram per cubic centimeter and a melt index of between .1–2.0, the interface between said paint and said container walls being of such an impermanent character that said paint is substantially free of adherence to said container walls.

2. A package as defined in claim 1 wherein said poylethylene has a density of approximately .95 and a melt index of less than .5.

References Cited in the file of this patent

UNITED STATES PATENTS

| 132,874 | Stevens | Nov. 5, 1872 |
| 3,025,252 | Jack | Mar. 13, 1962 |

FOREIGN PATENTS

| 1,140,943 | France | Mar. 11, 1957 |

Notice of Adverse Decision in Interference

In Interference No. 93,736 involving Patent No. 3,063,559, J. S. Bergman, Packaging tacky latex emulsion paints in containers manufactured from polyolefenic materials, final judgment adverse to the patentee was rendered Sept. 10, 1964, as to claims 1 and 2.

[*Official Gazette October 27, 1964.*]